(12) United States Patent
Park et al.

(10) Patent No.: US 9,767,959 B2
(45) Date of Patent: Sep. 19, 2017

(54) MULTILAYER ELECTRONIC COMPONENT

(71) Applicant: SAMSUNG ELECTRO-MECHANICS CO., LTD., Suwon-Si, Gyeonggi-Do (KR)

(72) Inventors: Min Cheol Park, Suwon-Si (KR); Young Ghyu Ahn, Suwon-Si (KR); Sang Soo Park, Suwon-Si (KR)

(73) Assignee: SAMSUNG ELECTRO-MECHANICS CO., LTD., Suwon-si, Gyeonggi-do (KR)

(*) Notice: Subject to any disclaimer, the term of this patent is extended or adjusted under 35 U.S.C. 154(b) by 40 days.

(21) Appl. No.: 14/919,452

(22) Filed: Oct. 21, 2015

(65) Prior Publication Data
US 2016/0133384 A1    May 12, 2016

(30) Foreign Application Priority Data

Nov. 7, 2014   (KR) .......................... 10-2014-0154673

(51) Int. Cl.
| | | |
|---|---|---|
| *H01G 4/30* | (2006.01) | |
| *H01G 4/012* | (2006.01) | |
| *H01G 4/38* | (2006.01) | |
| *H01G 4/12* | (2006.01) | |
| *H01G 4/232* | (2006.01) | |

(52) U.S. Cl.
CPC ............... *H01G 4/012* (2013.01); *H01G 4/12* (2013.01); *H01G 4/232* (2013.01); *H01G 4/30* (2013.01); *H01G 4/38* (2013.01)

(58) Field of Classification Search
None
See application file for complete search history.

(56) References Cited

U.S. PATENT DOCUMENTS

| | | | | |
|---|---|---|---|---|
| 4,638,402 A | * | 1/1987 | Lim ....................... | H01G 4/385 29/25.42 |
| 5,517,385 A | * | 5/1996 | Galvagni ............... | H01G 4/385 361/312 |
| 7,075,776 B1 | * | 7/2006 | Devoe ..................... | H01G 4/30 361/303 |
| 7,248,458 B2 | | 7/2007 | Mruz | |
| 8,446,705 B2 | | 5/2013 | Ritter et al. | |
| 2006/0250747 A1 | * | 11/2006 | Takashima ............... | H01G 4/12 361/272 |

(Continued)

FOREIGN PATENT DOCUMENTS

| | | |
|---|---|---|
| JP | 2014-036214 A | 2/2014 |
| KR | 10-2007-0045656 A | 5/2007 |

*Primary Examiner* — Dion R Ferguson
(74) *Attorney, Agent, or Firm* — McDermott Will & Emery LLP

(57) ABSTRACT

A multilayer electronic component includes a ceramic body including a plurality of dielectric layers, a plurality of capacitor parts disposed in the ceramic body, including a plurality of internal electrodes alternately exposed to both end surfaces of the ceramic body in a length direction of the ceramic body, and having different capacitances, and first and second external electrodes formed on both end surfaces of the ceramic body in the length direction of the ceramic body and connected to the plurality of internal electrodes, wherein the plurality of capacitor parts include three or more capacitor parts and connected in parallel with each other.

11 Claims, 4 Drawing Sheets

A - A'

(56) References Cited

U.S. PATENT DOCUMENTS

| | | | |
|---|---|---|---|
| 2007/0121275 A1* | 5/2007 | Takashima | H01G 4/385 |
| | | | 361/311 |
| 2009/0244807 A1* | 10/2009 | Lee | H01G 4/005 |
| | | | 361/306.2 |
| 2010/0128413 A1* | 5/2010 | Takashima | H01G 4/012 |
| | | | 361/306.3 |
| 2012/0257323 A1* | 10/2012 | Hayakawa | H01G 4/30 |
| | | | 361/301.4 |
| 2014/0043719 A1 | 2/2014 | Togashi | |
| 2014/0293500 A1* | 10/2014 | Seo | H01G 4/12 |
| | | | 361/301.4 |
| 2015/0115893 A1* | 4/2015 | Lee | H01G 4/30 |
| | | | 320/135 |

* cited by examiner

MULTILAYER ELECTRONIC COMPONENT

CROSS-REFERENCE TO RELATED APPLICATION

This application claims the priority and benefit of Korean Patent Application No. 10-2014-0154673 filed on Nov. 7, 2014, with the Korean Intellectual Property Office, the disclosure of which is incorporated herein by reference.

BACKGROUND

The present disclosure relates to a multilayer electronic component and a board having the same.

The small-sized terminal market for portable devices has rapidly grown due to the emergence of a smart phones and tablet PCs in such a way that competition for multifunctionalization and miniaturization and thinness of portable terminals has further intensified.

Among portable devices, modularization of a wireless communications circuit has proceeded, such that a decrease in volume itself has been required in addition to multi-band correspondence.

Meanwhile, as wireless modules or radio frequency (RF) analog circuits have been driven at higher frequencies due to improved processability of a central processing unit (CPU) base band part, the wireless modules or RF analog circuits may be subjected to electromagnetic interference by peripheral circuits, such that communications errors may be easily generated.

As a frequency of a used signal is increased as described above, since a frequency region of the signal is increased, and the signal becomes sensitive to noise, in a case of a high-speed signal process, high technology and additional consideration for impedance matching and a noise level of a device have been required.

Meanwhile, a multilayer ceramic capacitor, a multilayer electronic component, is mounted on printed circuit boards of various electronic products such as display devices, including liquid crystal displays (LCDs), a plasma display panels (PDPs), and the like, computers, smart phones, mobile phones, and the like, serving as an electronic component for reducing noise.

A generally used multilayer ceramic capacitor has a parasitic inductance component, and thus, a loss of a frequency component of 10 GHz or more is increased, such that a bandwidth of the entire module may be decreased, and reflection characteristics may also be deteriorated.

Therefore, research into a DC block capacitor capable of being used in a wide band has been required.

SUMMARY

An aspect of the present disclosure may provide a multilayer electronic component and a board having the same.

According to an aspect of the present disclosure, a multilayer electronic component may include: a ceramic body including a plurality of dielectric layers; a plurality of capacitor parts disposed in the ceramic body, including a plurality of internal electrodes alternately exposed to both end surfaces of the ceramic body in a length direction of the ceramic body, and having different capacitances; and first and second external electrodes formed on both end surfaces of the ceramic body in the length direction of the ceramic body and connected to the plurality of internal electrodes, wherein the plurality of capacitor parts may include three or more capacitor parts connected in parallel with each other.

The plurality of capacitor parts may include a first capacitor part in which first and second internal electrodes overlap each other, a second capacitor part in which third and fourth internal electrodes overlap each other, and a third capacitor part in which fifth and sixth internal electrodes overlap each other.

According to another aspect of the present disclosure, a board of a multilayer electronic component may include: a printed circuit board having first and second electrode pads formed thereon; and the multilayer electronic component as described above, mounted on the printed circuit board.

BRIEF DESCRIPTION OF DRAWINGS

The above and other aspects, features and other advantages of the present disclosure will be more clearly understood from the following detailed description taken in conjunction with the accompanying drawings, in which.

DETAILED DESCRIPTION

Figure 1:
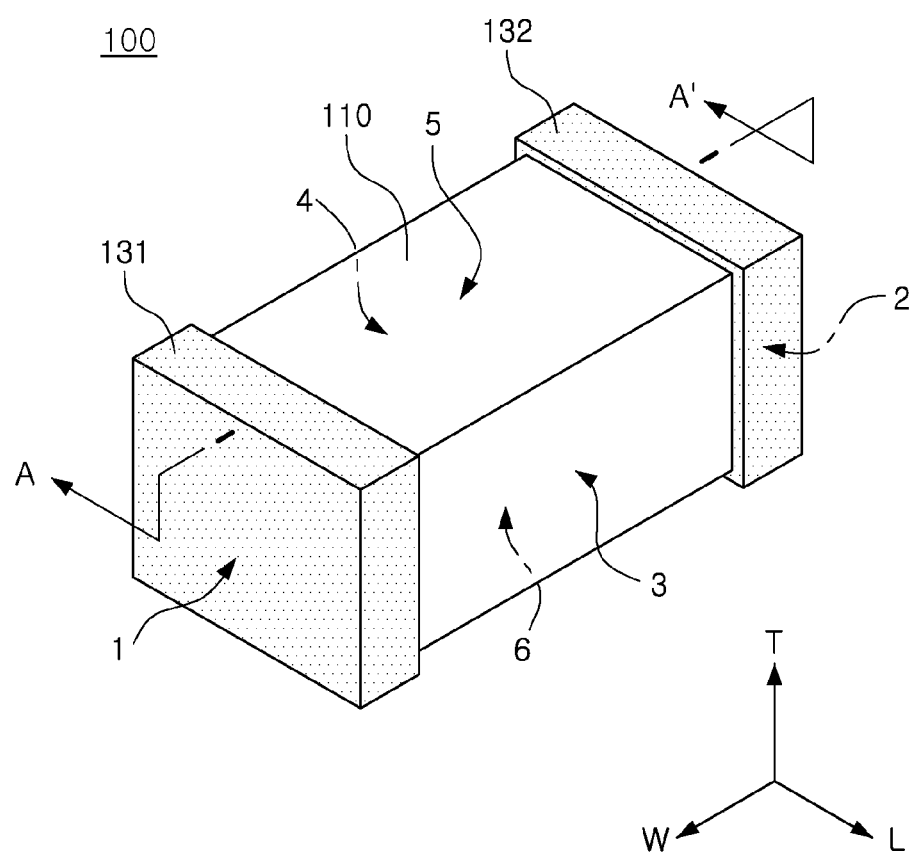
FIG. 1 is a perspective diagram of a multilayer electronic component according to an exemplary embodiment in the present disclosure.

Hereinafter, embodiments of the present disclosure will be described in detail with reference to the accompanying drawings.

The disclosure may, however, be embodied in many different forms and should not be construed as being limited to the embodiments set forth herein. Rather, these embodiments are provided so that this disclosure will be thorough and complete, and will fully convey the scope of the disclosure to those skilled in the art.

In the drawings, the shapes and dimensions of elements may be exaggerated for clarity, and the same reference numerals will be used throughout to designate the same or like elements.

Directions of a hexahedron will be defined in order to clearly describe exemplary embodiments in the present disclosure. L, W, and T illustrated in the accompanying drawings refer to a length direction, a width direction, and a thickness direction, respectively. Here, the thickness direction may be the same as the direction in which dielectric layers are stacked.

Multilayer Electronic Component

FIG. 1 is a perspective diagram of a multilayer electronic component according to an exemplary embodiment.

Figure 2:
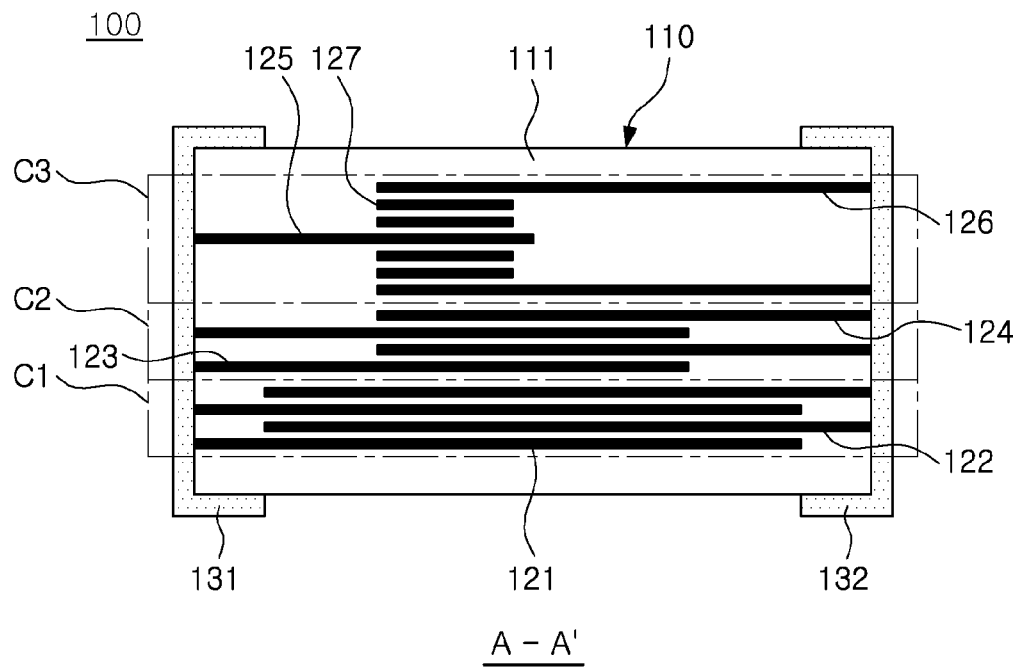
FIG. 2 is a cross-sectional diagram taken along line A-A' of FIG. 1.

FIG. 2 is a cross-sectional diagram taken along line A-A' of FIG. 1.

Referring to FIGS. 1 and 2, a multilayer ceramic electronic component 100, according to the exemplary embodiment in the present disclosure may include a ceramic body 110 including a plurality of dielectric layers 111 and having first and second main surfaces opposing each other, first and second end surfaces opposing each other in the length direction, and first and second side surfaces opposing each other in the width direction.

In the present exemplary embodiment, the ceramic body 110 may have first and second main surfaces 5 and 6 opposing each other, first and second side surfaces 3 and 4 opposing each other in the width direction, and first and second end surfaces 1 and 2 opposing each other in the length direction, connecting to the first and second main surfaces.

A shape of the ceramic body 110 is not limited, but may be a hexahedral shape as illustrated.

The ceramic body 110 may be formed by stacking a plurality of dielectric layers, and a plurality of internal electrodes may be disposed to be separated from each other in the ceramic body 110 with dielectric layers interposed therebetween.

The plurality of dielectric layers 111 configuring the ceramic body 110 may be in a sintered state, and adjacent dielectric layers may be integrated with each other so that boundaries therebetween are not readily apparent.

The dielectric layer 111 may be formed by sintering a ceramic green sheet containing ceramic powder, an organic solvent, and an organic binder. The ceramic powder, which is a material having high permittivity, may be a barium titanate ($BaTiO_3$) based material, a strontium titanate ($SrTiO_3$) based material, or the like, but is not limited thereto.

The multilayer electric component 100 may include a plurality of capacitor parts C1, C2, and C3 disposed in the ceramic body 110, including a plurality of internal electrodes 121, 122, 123, 124, 125, and 126 (sequentially, first to sixth internal electrodes) alternately exposed to both end surfaces of the ceramic body in the length direction, and having different capacitances.

According to the exemplary embodiment in the present disclosure, the plurality of internal electrodes 121 to 126 may be formed of a conductive paste containing a conductive metal.

The conductive metal may be nickel (Ni), copper (Cu), palladium (Pd), or an alloy thereof, but is not limited thereto.

The internal electrodes may be printed on a ceramic green sheet configuring the dielectric layer using the conductive paste by a printing method such as a screen printing method or a gravure printing method.

The ceramic green sheets on which the internal electrodes are printed may be alternately stacked and sintered, thereby forming the ceramic body.

Further, the plurality of capacitor parts C1, C2, and C3 may include three or more capacitor parts connected in parallel with each other.

In detail, the plurality of capacitor parts C1, C2, and C3 may include a first capacitor part C1 in which the first and second internal electrodes 121 and 122 overlap each other, a second capacitor part C2 in which the third and fourth internal electrodes 123 and 124 overlap each other, and a third capacitor part C3 in which the fifth and sixth internal electrodes 125 and 126 overlap each other.

Further, the multilayer electronic component 100 may include first and second external electrodes 131 and 132 formed on both end surfaces of the ceramic body 110 in the length direction and connected to the plurality of internal electrodes 121 to 126.

According to the exemplary embodiment in the present disclosure, a mounting surface of the multilayer electronic component 100 may be the second main surface 6 of the ceramic body 110.

The first and second external electrodes 131 and 132 may be formed of a conductive paste including a conductive metal.

The conductive metal may be nickel (Ni), copper (Cu), tin (Sn), or an alloy thereof, but is not limited thereto.

The conductive paste may further contain an insulating material. The insulating material may be, for example, glass, but is not limited thereto.

A method of forming the first and second external electrodes 131 and 132 is not limited, and may be formed on the ceramic body by a printing method, a dipping method, or another method such as a plating method, or the like.

Plating layers may later be further formed on the first and second external electrodes 131 and 132.

The first external electrode 131 may be connected to the first, third, and fifth internal electrodes 121, 123, and 125 among the plurality of internal electrodes 121 to 126, and the second external electrode 132 may be connected to the second, fourth, and sixth internal electrodes 122, 124, and 126 among the plurality of internal electrodes 121 to 126.

Hereinafter, among configurations of the multilayer electronic component 100 according to the exemplary embodiment, the plurality of internal electrodes 121 to 126 and the plurality of capacitor parts C1, C2, and C3 will be described in detail with reference to FIGS. 2 through 4.

Referring to FIG. 2, the plurality of capacitor parts C1, C2, and C3 may include the first capacitor part C1 in which the first and second internal electrodes 121 and 122 overlap each other, the second capacitor part C2 in which the third and fourth internal electrodes 123 and 124 overlap each other, and the third capacitor part C3 in which the fifth and sixth internal electrodes 125 and 126 overlap each other.

In detail, the plurality of capacitor parts C1, C2, and C3 may include three or more capacitor parts in which an area of overlapping portions of the internal electrodes is different from each other.

Further, the plurality of capacitor parts C1, C2, and C3 may include three or more capacitor parts in which a number of stacked internal electrodes is different from each other.

The plurality of capacitor parts C1, C2, and C3 may have different capacitances, so that several capacitors such as a low-frequency capacitor part and a high-frequency capacitor part, or the like, may be implemented in a single electronic component.

For example, the low-frequency capacitor part may be disposed in the ceramic body 110 to have a larger capacitance than that of the high-frequency capacitor part.

In detail, a method of manufacturing the plurality of capacitor parts having different capacitances is not limited. For example, the plurality of capacitor parts having different capacitances may be manufactured by adjusting the numbers of stacked internal electrodes, adjusting the areas of the overlapped portions between the internal electrodes, or adjusting dielectric materials of the dielectric layers 111 disposed between the internal electrodes.

Among the plurality of capacitor parts C1, C2, and C3, the first capacitor part C1, which is a capacitor having a relatively high capacitance, may be a low-frequency capacitor part, and the third capacitor part C3, which is a capacitor having a relatively low capacitance, may be provided as a high-frequency capacitor part.

In addition, the second capacitor part C2 may have a capacitance corresponding to an intermediate value between the capacitances of the first and third capacitor parts C1 and C3, and may serve as a capacitor in a frequency band between a low frequency and a high frequency.

In the third capacitor part C3, floating electrode 127 may be further disposed between the fifth and sixth internal electrodes 125 and 126.

According to the exemplary embodiment in the present disclosure, the third capacitor part C3 may be formed by overlapping the fifth and sixth internal electrodes 125 and 126 and the floating electrode 127 may be further disposed between the fifth and sixth internal electrodes 125 and 126, thereby forming a low-capacitance capacitor and serving as a high-frequency capacitor part.

Although FIG. 2 illustrates two floating electrode 127 respectively disposed between each of the fifth and sixth internal electrodes 125 and 126, the number of floating electrode 127 is not limited thereto. For example, two or more floating electrode 127 may be disposed therebetween.

Further, although FIG. 2 illustrates one of each of the fifth and sixth internal electrodes 125 and 126 facing each other, the number of each of the fifth and sixth internal electrodes is not limited thereto. For example, a fifth internal electrode 125 and a sixth internal electrode 126 may be formed by a plurality of internal electrodes having the same polarity being disposed adjacent to each other.

As described above, in a case in which the plurality of internal electrodes having the same polarity are disposed to be adjacent to each other, there is an effect of a thickness of the internal electrodes increasing, such that equivalent series resistance (ESR) may be decreased.

Figure 3:
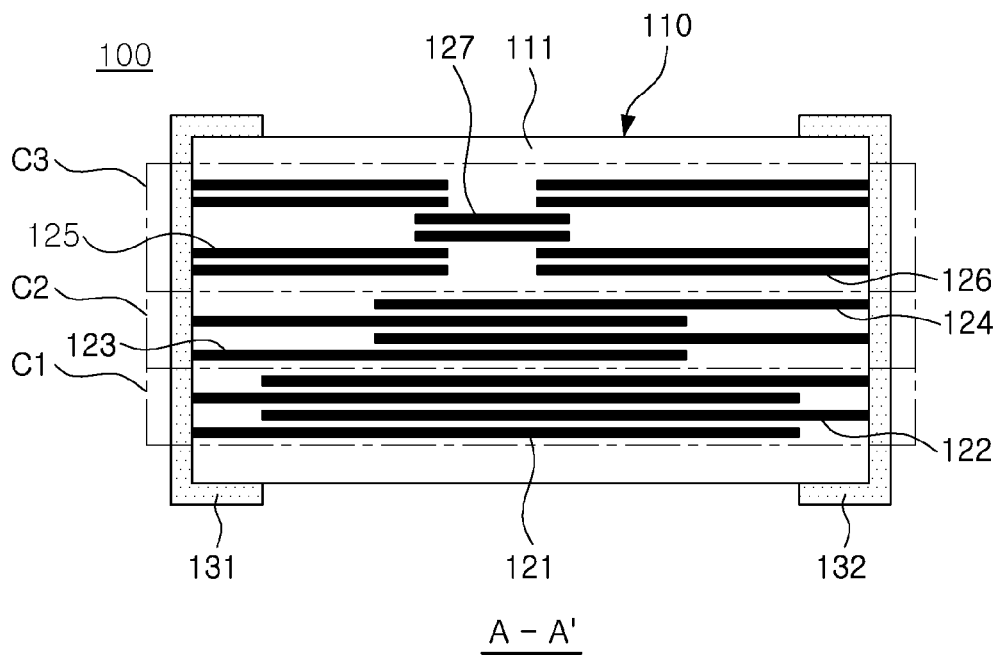
FIG. 3 is a cross-sectional diagram taken along the line A-A' of FIG. 1 according to another exemplary embodiment.

FIG. 3 is a cross-sectional diagram taken along the line A-A' of FIG. 1 according to another exemplary embodiment.

Referring to FIG. 3, in a multilayer electronic component 100 according to another exemplary embodiment, a fifth internal electrode 125 and a sixth internal electrode 126 may be formed by a plurality of internal electrodes having the same polarity being disposed adjacent to each other. In addition, the fifth and sixth internal electrodes 125 and 126 may be disposed on a single dielectric layer 111 and insulated from each other in a ceramic body 110, wherein the fifth internal electrode 125 may be exposed to one end surface of the ceramic body 110 in the length direction, and the sixth internal electrode 126 may be exposed to the other end surface thereof.

Further, at least one floating electrode 127 facing the fifth and sixth internal electrodes 125 and 126 may be disposed between the fifth internal electrode 125 and the sixth internal electrode 126 formed by a plurality of internal electrodes having the same polarity and disposed adjacent to each other.

Although FIG. 3 illustrates two floating electrodes 127, the number of floating electrodes 127 is not limited thereto. For example, two or more floating electrodes 127 may be disposed.

In the multilayer electronic component 100 according to another exemplary embodiment in the present disclosure, since at least one floating electrode 127 facing the fifth and sixth internal electrodes 125 and 126 is disposed between the fifth internal electrode 125 and the sixth internal electrode 126 formed by a plurality of internal electrodes having the same polarity and disposed adjacent to each other in a third capacitor part C3, a low-capacitance capacitor may be formed, such that the third capacitor part may serve as a high-frequency capacitor part. In addition, since the plurality of internal electrodes having the same polarity are disposed to be adjacent to each other, there is an effect of a thickness of the internal electrodes increasing, such that equivalent series resistance (ESR) may be decreased.

Figure 4:
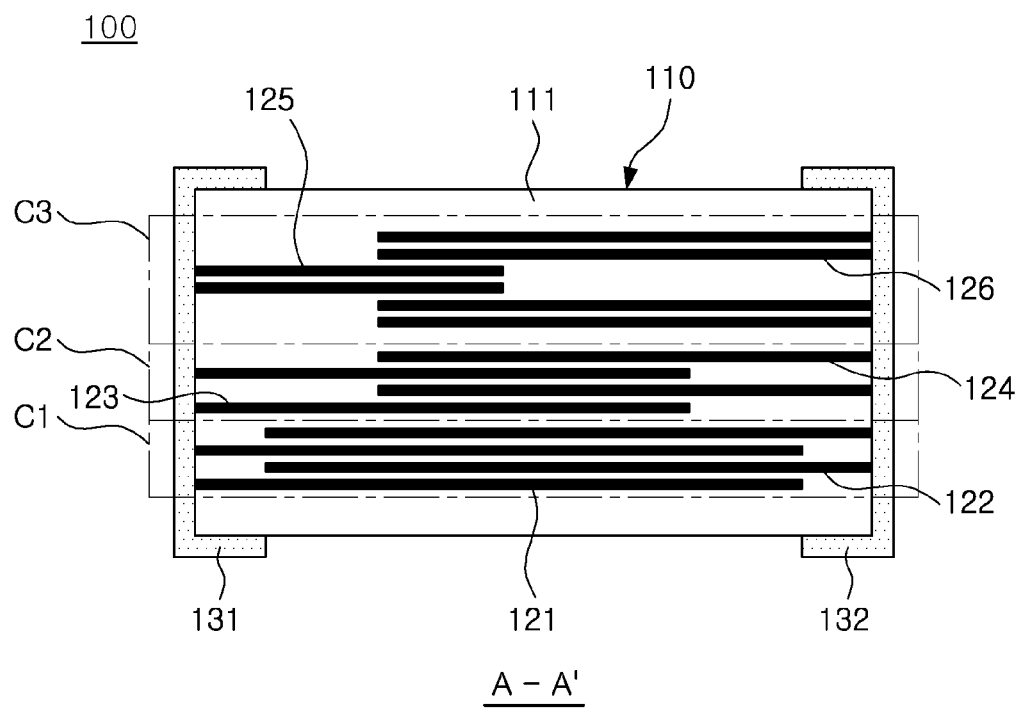
FIG. 4 is a cross-sectional diagram taken along the line A-A' of FIG. 1 according to another exemplary embodiment.

FIG. 4 is a cross-sectional diagram taken along the line A-A' of FIG. 1 according to another exemplary embodiment in the present disclosure.

Referring to FIG. 4, in a multilayer electronic component 100, according to another exemplary embodiment in the present disclosure, a fifth internal electrode 125 and a sixth internal electrode 126 formed by a plurality of internal electrodes having the same polarity of a third capacitor part C3 may be disposed adjacent to each other.

Therefore, in the multilayer electronic component 100, according to another exemplary embodiment in the present disclosure, since the third capacitor part C3 may have a structure in which the plurality of internal electrodes having the same polarity are disposed to be adjacent to each other, there is an effect of a thickness of the internal electrodes increasing, such that equivalent series resistance (ESR) may be decreased.

In the plurality of capacitor parts C1, C2, and C3 having different capacitances, the number of stacked internal electrodes forming a low-capacitance capacitor part may be smaller than that of stacked internal electrodes forming a high-capacitance capacitor part.

Therefore, the number of stacked internal electrodes in the third capacitor part C3, which is the low-capacitance capacitor part among the plurality of capacitor parts C1, C2, and C3, may be smaller than the number of stacked internal electrodes in the first capacitor part C1, which is the high-capacitance capacitor part among them.

Similarly, the numbers of stacked internal electrodes may be decreased according to a capacitance sequence, for example, in a sequence of the first capacitor part C1, which has the highest capacitance, the second capacitor part C2, and the third capacitor part C3.

Meanwhile, in the plurality of capacitor parts C1, C2, and C3 having different capacitances, an area of overlapping portions of the internal electrodes forming the low-capacitance capacitor part may be smaller than an area of overlapping portions of the internal electrodes forming the high-capacitance capacitor part.

Therefore, the areas of the overlapped portions between the internal electrodes in the third capacitor part C3 which is the low-capacitance capacitor part among the plurality of capacitor parts C1, C2, and C3, may be smaller than the areas of the overlapped portions between the internal electrodes in the first capacitor part C1 which is the high-capacitance capacitor part among them.

Similarly, the area of the overlapped portion between the internal electrodes may be decreased according to the capacitance sequence, for example, in the sequence of the first capacitor part C1, which has the highest capacitance, the second capacitor part C2, and the third capacitor part C3.

Referring to FIGS. 2 through 4, it may be appreciated that the area of the overlapped portion between the internal electrodes are decreased according to the capacitance sequence, for example, in the sequence of the first capacitor part C1, which has the highest capacitance, the second capacitor part C2, and the third capacitor part C3.

In the plurality of capacitor parts C1, C2, and C3 having different capacitances, dielectric layers 111 forming the low-capacitance capacitor part and the high-capacitance capacitor part may contain different materials from each other.

In detail, a dielectric material of the dielectric layers in the third capacitor part C3, which is the low-capacitance capacitor part among the plurality of capacitor parts C1, C2, and C3, may have lower permittivity than that of a dielectric material of the dielectric layers in the first capacitor part C1, which is the high-capacitance capacitor part among them.

Similarly, permittivity of the used dielectric materials may be decreased according to the capacitance sequence, for example, in the sequence of the first capacitor part C1, which has the highest capacitance, the second capacitor part C2, and the third capacitor part C3.

Figure 5:
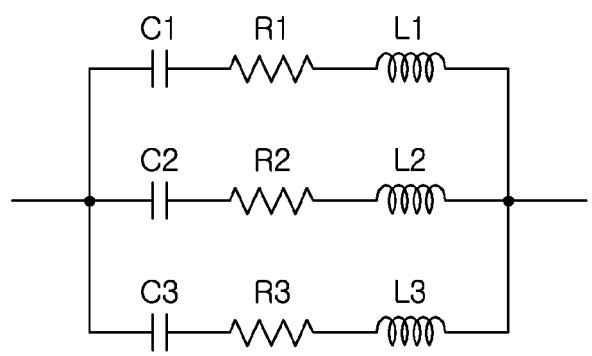
FIG. 5 is an equivalent circuit diagram of the multilayer electronic component illustrated in FIG. 1.

FIG. 5 is an equivalent circuit diagram of the multilayer electronic component illustrated in FIG. 1.

Referring to FIG. 5, the plurality of capacitor parts having different capacitances may include three or more capacitor parts connected in parallel with each other.

In the multilayer electronic component according to the exemplary embodiment in the present disclosure, the plurality of capacitors having various capacitance values such as the low-frequency capacitor, the high-frequency capacitor, and the like, may be configured in parallel with each other in a single electronic component, such that wideband characteristics may be implemented.

In detail, among the plurality of capacitors, the high-frequency capacitor may be more easily manufactured as compared to the related art.

In addition, the multilayer electronic component, according to the present disclosure, may include three or more capacitor parts in the single electronic component, such that wide band pass characteristics may be greatly improved.

Board Having Multilayer Electronic Component

Figure 6:
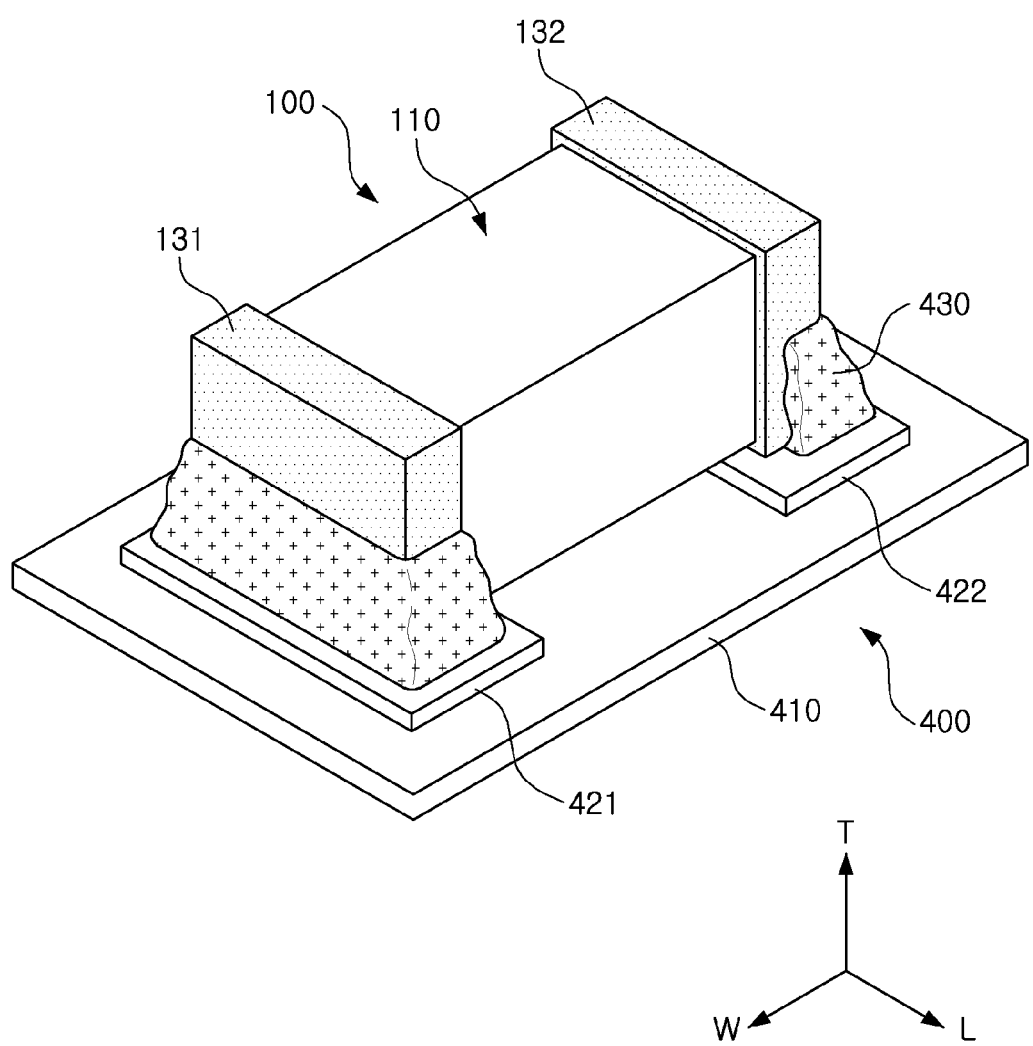
FIG. 6 is a perspective diagram illustrating a form in which the multilayer electronic component of FIG. 1 is mounted on a printed circuit board.

FIG. 6 is a perspective diagram illustrating a form in which the multilayer electronic component of FIG. 1 is mounted on a printed circuit board.

Referring to FIG. 6, a board 400 having a multilayer electronic component 100 according to the exemplary embodiment may include a printed circuit board 410 on which internal electrodes of the multilayer electronic component 100 are horizontally mounted and first and second electrode pads 421 and 422 formed on the printed circuit board 410 to be spaced apart from each other.

In this case, the multilayer electronic component 100 may be electrically connected to the printed circuit board 410 by solder 430 in a state in which first and second external electrodes 131 and 132 are positioned on the first and second electrode pads 421 and 422 so as to come in contact with each other.

Except for the description described above, a description of features which overlap with those of the above-mentioned multilayer electronic component according to the exemplary embodiment in the present disclosure will be omitted.

As set forth above, according to exemplary embodiments in the present disclosure, in the multilayer electronic component, a plurality of capacitors having various capacitance values, such as a low-frequency capacitor, a high-frequency capacitor, and the like may be configured in parallel with each other in a single electronic component, such that wideband characteristics may be implemented.

In detail, among the plurality of capacitors, the high-frequency capacitor may be more easily manufactured as compared to that of the related art.

In addition, the multilayer electronic component, according to exemplary embodiments in the present disclosure, may include three or more capacitor parts in the single electronic component, such that wide band pass characteristics may be significantly improved.

While exemplary embodiments have been shown and described above, it will be apparent to those skilled in the art that modifications and variations could be made without departing from the scope of the present invention as defined by the appended claims.

What is claimed is:

1. A multilayer electronic component comprising:
a ceramic body including a plurality of dielectric layers;
a plurality of capacitor parts disposed in the ceramic body, including a plurality of internal electrodes alternately exposed to either of end surfaces of the ceramic body in a length direction of the ceramic body and overlapping each other; and
first and second external electrodes formed on respective end surfaces of the ceramic body in the length direction of the ceramic body and connected to the plurality of internal electrodes,
wherein the plurality of capacitor parts include three or more capacitor parts having different capacitances from one another and connected in parallel with each other, and
wherein an area of an overlapping portion between the internal electrodes exposed to either of end surfaces of the ceramic body in one capacitor part of the plurality of capacitor parts is different from an area of an overlapping portion between the internal electrodes exposed to either of end surfaces of the ceramic body in another capacitor part of the plurality of capacitor parts.

2. The multilayer electronic component of claim 1, wherein the plurality of capacitor parts include a first capacitor part in which first and second internal electrodes overlap each other, a second capacitor part in which third and fourth internal electrodes overlap each other, and a third capacitor part in which fifth and sixth internal electrodes overlap each other.

3. The multilayer electronic component of claim 2, wherein the third capacitor part is provided as a high-frequency capacitor part.

4. The multilayer electronic component of claim 2, wherein in the third capacitor part, a floating electrode is further disposed between the fifth and sixth internal electrodes.

5. The multilayer electronic component of claim 4, wherein the floating electrode is provided in plural.

6. The multilayer electronic component of claim 2, wherein the fifth internal electrode and the sixth internal electrode respectively comprise a plurality of internal electrodes having the same polarity and disposed adjacent to each other.

7. The multilayer electronic component of claim 2, wherein the fifth internal electrode and the sixth internal electrode respectively comprise a plurality of internal electrodes having the same polarity and disposed to be adjacent to each other, the fifth and sixth internal electrodes are disposed on a single dielectric layer and insulated from each other in the ceramic body, the fifth internal electrodes are exposed to one end surface of the ceramic body in the length direction, and the sixth internal electrodes are exposed to the other end surface thereof.

8. The multilayer electronic component of claim 7, wherein at least one or more floating electrodes facing the fifth and sixth internal electrodes are disposed between the fifth internal electrode and the sixth internal electrode respectively comprising the plurality of internal electrodes having the same polarity and disposed to be adjacent to each other.

9. The multilayer electronic component of claim 1, wherein in the plurality of capacitor parts having different capacitances, an area of overlapping portions of internal electrodes forming a low-capacitance capacitor is smaller than area of overlapping portions of internal electrodes forming a high-capacitance capacitor.

10. The multilayer electronic component of claim 1, wherein in the plurality of capacitor parts having different capacitances, dielectric layers forming a low-capacitance capacitor and a high-capacitance capacitor contain different materials from each other.

11. The multilayer electronic component of claim 1, wherein the plurality of capacitor parts include three or more capacitor parts in which a number of stacked internal electrodes is different from each other.

* * * * *